United States Patent [19]

Van Dooren

[11] Patent Number: 5,305,845

[45] Date of Patent: Apr. 26, 1994

[54] WHEELCHAIR SHUTTLE

[75] Inventor: Alexander A. A. Van Dooren, Eersel, Netherlands

[73] Assignee: Freewiel Techniek, Eersel, Netherlands

[21] Appl. No.: 923,449

[22] Filed: Aug. 3, 1992

[30] Foreign Application Priority Data

Aug. 5, 1991 [NL] Netherlands .................. 9101349

[51] Int. Cl.$^5$ .............................................. B60K 1/00
[52] U.S. Cl. .................. 180/65.1; 280/43.17; 280/43.22
[58] Field of Search ............... 280/641, 642, 643, 43, 280/43.17, 43.18, 43.22, 43.23, 43.24, 688, 690, 700, 701, 113, 114, 115, 127, 128, 130, 131, 709; 180/65.1, 65.5, 65.6, 65.7

[56] References Cited

U.S. PATENT DOCUMENTS 3,921,740 11/1975 Forster ............................. 180/26 R

FOREIGN PATENT DOCUMENTS

| | | |
|---|---|---|
| 0251136 | 1/1988 | European Pat. Off. . |
| 2442629 | 6/1980 | France . |
| 2521500 | 8/1983 | France . |
| 2597801 | 10/1987 | France . |
| 2642722 | 8/1990 | France . |
| 2110997 | 6/1983 | United Kingdom . |

Primary Examiner—Richard M. Camby
Attorney, Agent, or Firm—Foley & Lardner

[57] ABSTRACT

A greatly improved, compactly dimensioned, three-wheeled wheelchair shuttle with a box shaped interior and a flat floor panel, the rear side of which can be closed by a folding ramp construction. With the aid of the rear wheel mounting construction and together with the aforementioned ramp construction pivoted on the rear of the wheelchair shuttle, the aforementioned floor panel can be lowered to the road surface, enabling a wheelchair to enter the wheelchair shuttle from the rear. The movement of the mounting construction for the rear wheels is achieved using special, high quality suspension elements which are controlled by a compressor and its associated components. The wheelchair shuttle, in accordance with the invention, has a separate rear wheel drive propelled by a battery powered electric motor.

18 Claims, 5 Drawing Sheets

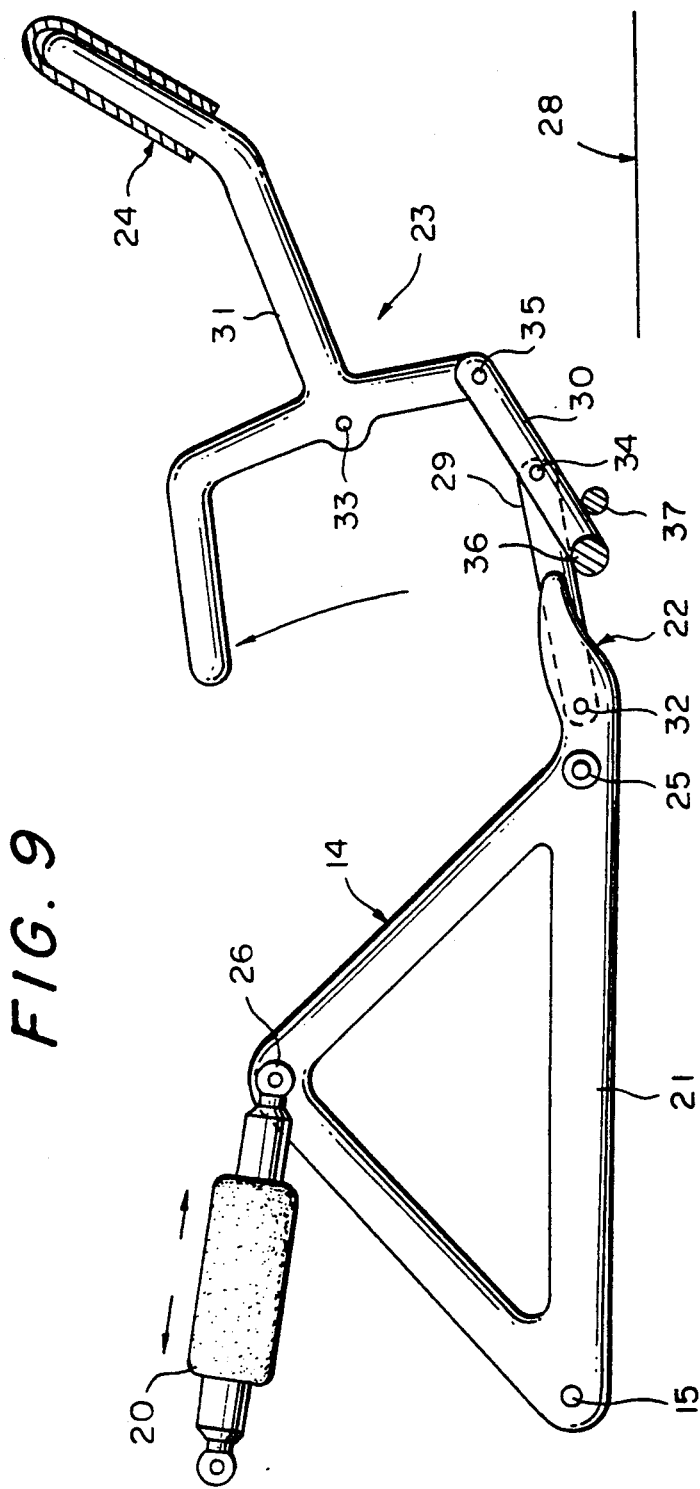

WHEELCHAIR SHUTTLE

BACKGROUND OF THE INVENTION

1. Field of the Invention

The invention is concerned with a device constructed as a self-propelled steerable vehicle for one person, who would normally be invalided by a leg and/or hip condition, the driver's seat of which may be a wheelchair. More particularly, the invention relates to a vehicle whereby the aforementioned wheelchair may be driven onto the vehicle's bottom plate, the so-called floor panel, that for this purpose is pivoted, thereby providing an up and down movement in relation to the road surface, and which vehicle is equipped with at least one front wheel and two rear wheels, at least one of which may be driven.

2. Discussion of the Related Art

Such a device or vehicle is known from the European patent application number 0 251 136, by the applicant Yamaha Motor Co. Ltd., 2500 Shingai, Iwata-shi Shizuoka-ken, Japan.

This application is concerned with a low mounted box shaped vehicle, the so-called flat floor panel of which is pivoted and may be lowered to the road surface. During this movement, the rear side closing construction is simultaneously opened downwards, enabling a wheelchair to be driven in from behind. With the aid of a compressed air cylinder, the movement of the floor panel and the rear closing construction is accomplished by a number of bars and the rear wheel mounting. The box shaped vehicle has a front panel and left and right side-panels. The box shaped vehicle is equipped with a steerable front wheel and two driven rear wheels. The rear wheels are driven together by either an electric motor or a petrol engine.

The raising and lowering of the previously mentioned flat floor panel is made possible with the aid of a pneumatic cylinder and pump which has two possible positions, namely the lowering or external air pressure position, and several atmospheres overpressure or the maximum over pressure position. The closing rear side is a U-shaped construction that is simultaneously operated by the aforementioned pneumatic cylinder via a pivoted bar. When the air pressure in the pneumatic cylinder is released, the rear wheels move upwards in their mounting construction, simultaneously turning the U-shaped rear construction downwards onto the floor panel. This enables the wheelchair to be driven into the box-shaped vehicle from behind. Subsequently, the air pump is switched to the pneumatic cylinder, the rear wheels are pushed downwards and the U-shaped rear construction is simultaneously turned upwards behind the rear wheels of the wheelchair. Following this, the invalid's journey in the wheelchair may begin.

It has appeared from tests that the previously described familiar vehicle for taking up and transporting an invalid person in a wheelchair, also a type of wheelchair shuttle, has a great number of drawbacks. Through these drawbacks, this vehicle would appear less suitable for easy and comfortable use by a handicapped person.

In the first place, the second point of the wheel mounting construction, pivoted on the aforementioned compressed air cylinder, is connected to the vehicle's body frame. A compressed air cylinder is unsuitable for use as a suspension element as this cylinder has only two "fixed" positions: full pressure, as the vehicle's operational pressure and the external air pressure for lowering the aforementioned floor panel. In brief, a compressed air cylinder as such is not designed for use as a suspension and/or damper element, but only for effecting the mechanisms's two positions, which two positions are also fixed. Any form of comfortable suspension during the journey is therefore absent. Furthermore, the familiar vehicle has no provisions to prevent the invalid-occupied wheelchair from rolling back. Moreover, the U-shaped rear closure is turned up just above the floor panel in the drive-on position, causing an extra, serious resistance when driving onto the vehicle. This resistance has proved difficult for the invalid in his wheelchair from to overcome. Moreover, there are no provisions to prevent the wheelchair moving during the journey, which could be extremely dangerous for the invalid in the wheelchair during a sudden or emergency stop. It can now also be said that driving a wheelchair onto the floor panel, which is relatively thick, is moderately difficult for the user.

SUMMARY OF THE INVENTION

In order to alleviate the aforementioned drawbacks, the device, in accordance with the invention under consideration, has been implemented as a self-propelled, steerable vehicle for an invalid person. It corresponds to the wheelchair shuttle named in the exordium for the invention. It is constructed in a surprising manner for the user, and in such a manner that each rear wheel is mounted in a separate construction, which may simultaneously be pivoted upwards or downwards respectively in relation to the floor panel with the aid of the adjustable rear wheel suspension. It is also constructed in such a manner that the floor panel can be lowered to the road surface. The floor panel is equipped with a drive-on construction which can be driven on to by a wheelchair, and is equipped with means to prevent any wheelchair which has been driven on from rolling backwards. The side panels of the aforementioned vehicle are furnished with means to prevent the wheelchair from rolling forwards, that due to the aforementioned vehicle are furnished with means to prevent the wheelchair from rolling forwards, that due to the aforementioned adjustable suspension on the rear wheel mounting construction they too may in turn also be moved downwards. The reality of the wheelchair being unable to move during the journey is assured by the aforementioned folding ramp construction when it is in the raised position.

Furthermore, in accordance with the invention, the device has now been developed to such a degree that each of the rear wheels may be independently driven by a power source.

The advantage of this is that a compactly constructed wheelchair shuttle results, both as far as the length and width dimensions are concerned, the latter being reduced to a maximum of 1 meter. The driving power source is located in front of the rear wheel, resulting in the smallest width dimensions for the wheelchair shuttle.

The device, in accordance with the invention, has ben developed further in such a manner that the aforementioned mounting construction for the rear wheel consists of a triangular frame, pivoted in relation to the vehicle frame and forming the first rear angle of the base of the aforementioned triangular frame. The base of the triangular frame often is referred to as a swing arm, the wheel mounting of which is located at the second angle on the base of the triangular frame. The top angle of the aforementioned triangular frame has a pivoted mounting for the adjustable suspension, the triangular frame having another pivoted mounting to a second point on the vehicle frame. The aforementioned folding ramp construction is operable by means of a specially shaped extension to the base of the swing-arm next to the wheel mounting on the triangular frame.

The advantage of this is the formation of an extremely solid and wear resistant mounting. At the same time providing a suitable manner for operating the folding ramp construction.

Furthermore, the device, in accordance with the invention, has been developed further in such a manner that the aforementioned triangular frames for the rear wheel mounting construction have been coupled together by means of a torsion bar between the first pivoted mountings at the rear angle of the base of the swing arms.

The advantage of this is that the undesirable rolling of the wheelchair shuttle when negotiating bends will be avoided.

The device, in accordance with the invention, has then been developed further in such a manner that the axle located at the rear angle of the first pivoted mounting on the base of the swing-arm on the mounting constructions triangular frame has been equipped with a driving disc for the purpose of driving the rear wheel, and also for coupling the aforementioned separate power source to each rear wheel.

The advantage of this is a highly efficient power transmission.

Furthermore, the device, in accordance with the invention, has been developed further in such a manner that the aforementioned adjustable suspension is adjustable in length and is of a type consisting of an inflatable bellows constructed around a shock absorber. The shock absorber employs an existing system, such as a complete Ride Leveller Compressor System from Monroe, consisting of the following four groups of components:

- a compressor for making compressed air available;
- a relay with fuse for switching the compressors power supply;
- an operating panel with pressure gauge which indicates the pressure in the inflatable bellows constructed around the shock absorber; and
- electric wiring and air lines.

The advantage of this is that an extremely comfortable suspension system, results, which has been very well developed following an existing system and for which all components can be freely purchased with all the advantages of service, guarantee, etc.

Furthermore, the device, in accordance with the invention, has been developed further in such a manner that the aforementioned means of preventing the wheelchair from rolling backwards after driving on to the ramp one incorporated in the floor panel, consisting of bellows in the floor panel at the location of the rear wheels. The means for preventing the wheelchair from rolling forwards are incorporated in the side panels, consisting of pivoted arms with a limited rotational angle, which may be fitted by hand in front of the wheelchair's rear wheel. The arm construction only has to be adjusted once to the required wheelchair wheel size.

The advantage of this is that once the wheelchair has ben driven on to the floor panel by the invalid person, it cannot roll backwards. The wheelchair is also prevented from shooting forwards during an emergency stop or when driving onto the shuttle too quickly.

Then the device, in accordance with the invention, has been developed further in such a manner that the aforementioned ramp construction consists of a ramp, fixed on both sides to a pivoted bar construction equipped with a stop boss, fitted to the ends of the bars in the bar construction. The bar construction is operated by the aforementioned extension to the base of the swing-arm on the triangular frame for the wheel mounting, through which the ramp construction may be folded upwards and downwards. When folded upwards, the ramp construction effectively locks the rear wheels of the wheelchair, and when folded downwards together with the pivoted floor panel, the device, in accordance with the invention, forms an extremely manageable ramp for the aforementioned wheelchair.

The advantage of this is an extremely comfortable, reliable and manageable ramp construction, requiring virtually no maintenance.

Then the device, in accordance with the invention, has been developed further in such a manner that the aforementioned pivoted bar constructions connected to one another consist of three special pivoted bars connected together. The first bar is pivoted at one end and fixed to the frame of the wheelchair shuttle. One point of the last or third bar is also pivoted at one end and fixed to the frame of the shuttle. The middle or second bar is equipped with the aforementioned stop boss in front of the swing-arm extension. The other pivoted points on the three bars have been fitted in a manner so that the bar construction remains in a so called push-through position when the ramp panel is in the folded position.

The advantage of this is that rear wheels of the wheelchair are extremely effectively and reliably locked during any journey. Moreover, after the push-through position of the bar construction, the swing-arm can move freely for the benefit of the wheelchair shuttle suspension.

Then the device, in accordance with the invention, has been developed further in such a manner that the aforementioned power source is an electric motor, powered by a rechargeable battery.

The advantages of this is that there is no noise pollution or exhaust gas emission, thereby increasing comfort for the invalid user of the wheelchair shuttle.

Then the device, in accordance with the invention, has been developed further in such a manner that the framework and the aforementioned floor panel have been manufactured from metal. The remaining panelling, in accordance with the invention, may be of synthetic material. The aforementioned metal is steel or aluminium, and the aforementioned synthetic material is ABB.

The advantages of this is the optimum use of materials in limiting the total weight, thereby further increasing the overall efficiency of the wheelchair shuttle.

BRIEF DESCRIPTION OF THE DRAWINGS

A further description is given below supported by illustrations of the wheelchair shuttle, in accordance with the invention in which:

FIG. 9 is a schematic side view of the rear wheel mounting construction of the device in accordance with the invention, the wheelchair shuttle, in connection with the bar mechanism for operating the folding ramp construction, showing the folding ramp construction in the raised, and therefore wheelchair locking position.

DETAILED DESCRIPTION OF THE PREFERRED EMBODIMENTS

Figure 1:
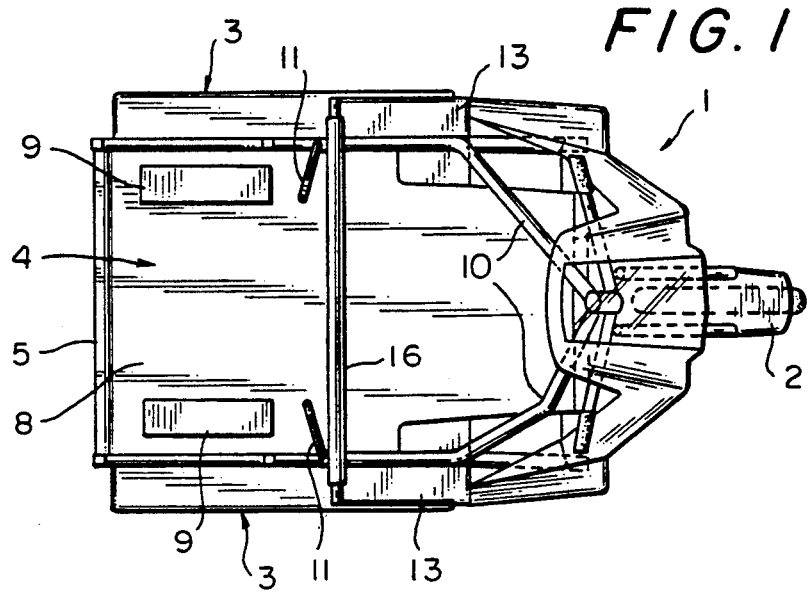
FIG. 1 is a plan view of the device, the wheelchair shuttle, in accordance with the invention, to which the panelling has been fitted.
Figure 5:
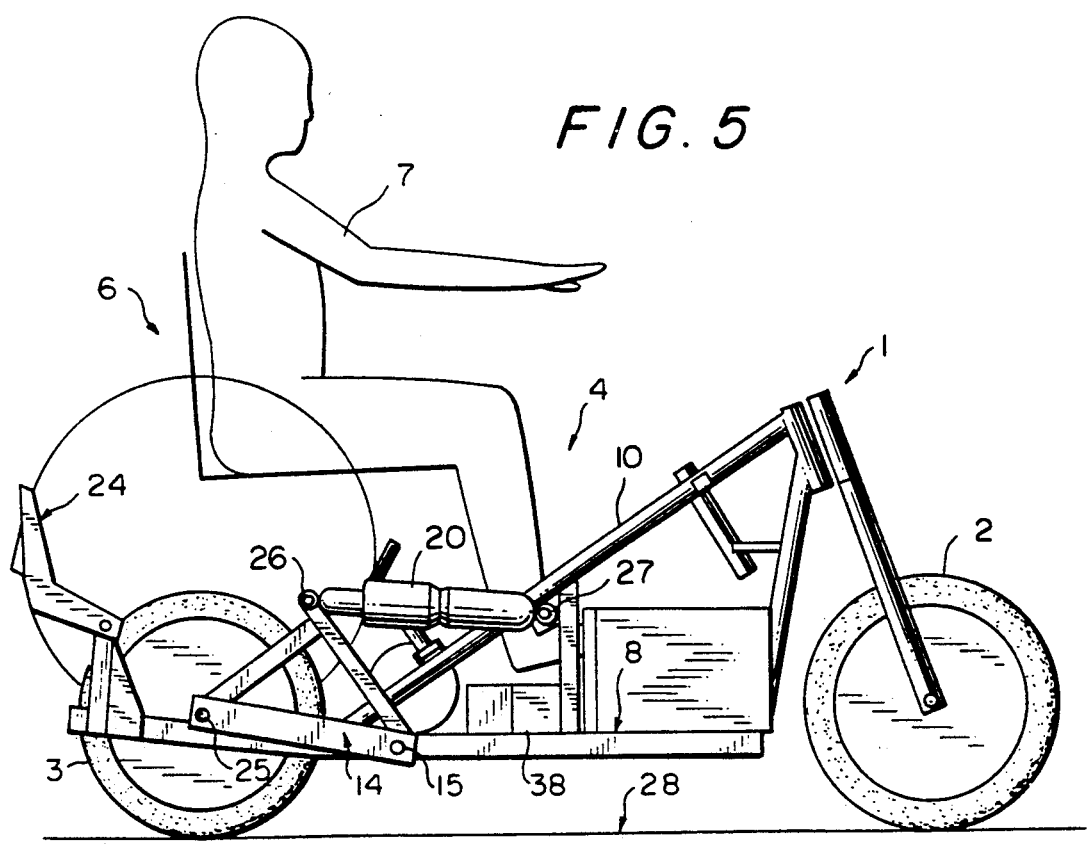
FIG. 5 is a side view of the wheelchair shuttle showing the frame with rear wheel mounting, adjustable suspension, a schematic illustration of the folding ramp construction and a schematic illustration of the wheelchair.
Figure 6:
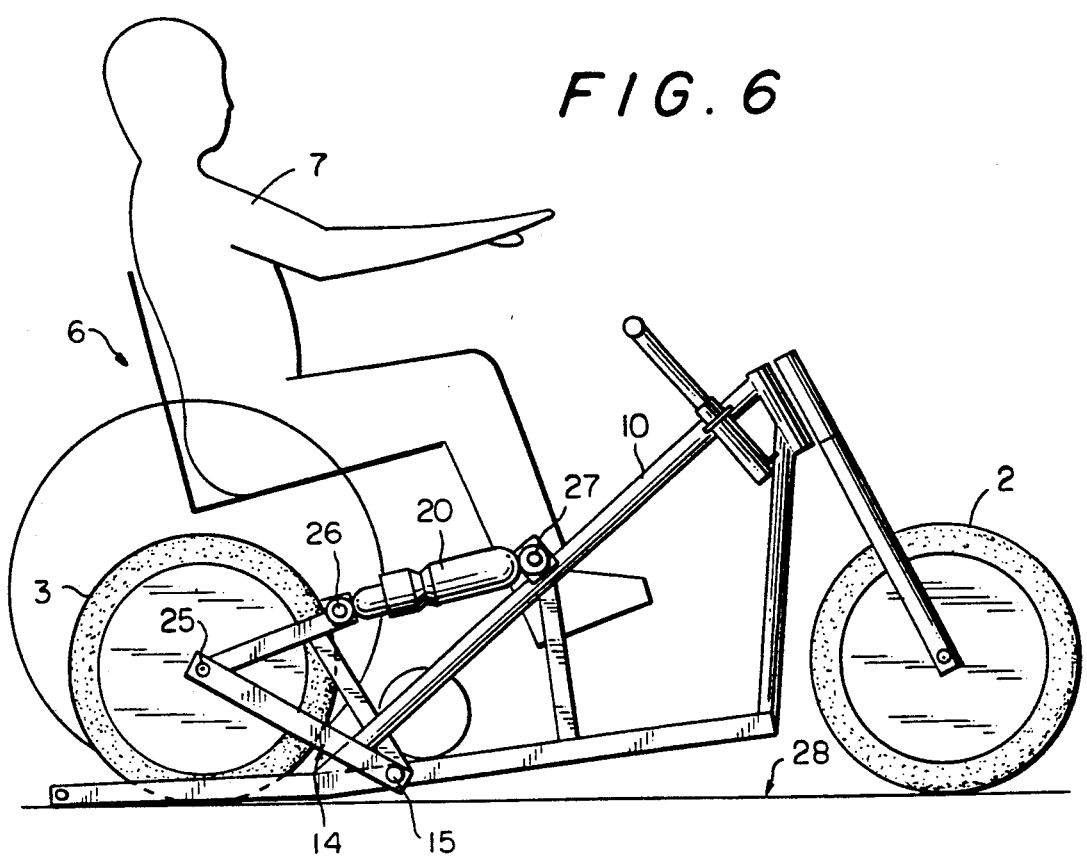
FIG. 6 is a side view of the wheelchair shuttle in accordance with the invention, in which the floor panel has been lowered and the wheelchair user is driving on to the wheelchair shuttle.
Figure 7:
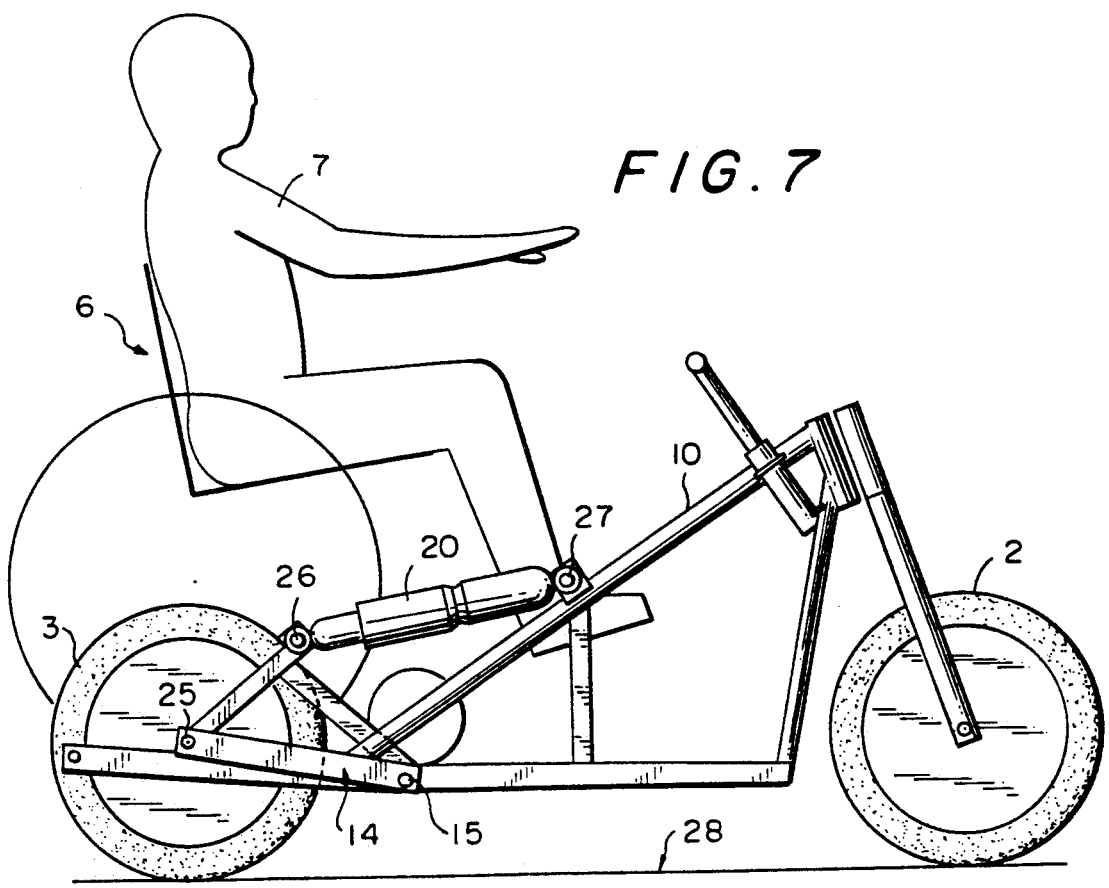
FIG. 7 is a side view of the wheelchair shuttle in accordance with the invention, in which the wheelchair is positioned fully in the wheelchair shuttle and the floor panel is in the raised position.

In FIG. 1 a plan view of the wheelchair shuttle 1 is shown in operational condition, in accordance with the invention. It should be mentioned here that the frame tubing located behind the panelling has been illustrated with solid lines. In the preferential implementation the wheelchair shuttle 1 is equipped with one front wheel 2 and two rear wheels 3. The wheelchair shuttle 1 has a generally box-shaped interior 4, which can be opened at the rear by a folding ramp construction 5. As shown in FIGS. 5 to 7, the interior can accommodate a wheelchair 6 with an invalid person 7. The wheelchair shuttle 1 has a flat floor panel 8 which can be lowered, in which hollows 9 have been made to prevent the wheelchair 6 from rolling backwards. The frame 10 has been equipped with means 11 to prevent the forward movement of the wheelchair. The aforementioned means 11 for preventing the wheelchair 6 from rolling forward may be incorporated in the side panels, consisting of pivoted arms with a limited rotational angle, which may be fitted by hand in front of the wheelchair's rear wheel, and which are construction only has to be adjusted once to the required wheelchair wheel size. These particular means 11 can be fitted in several variations. The front panelling 12 and the side panelling 13 are constructed from synthetic material and will be styled in accordance with the styling of an industrial designer.

Figure 2:
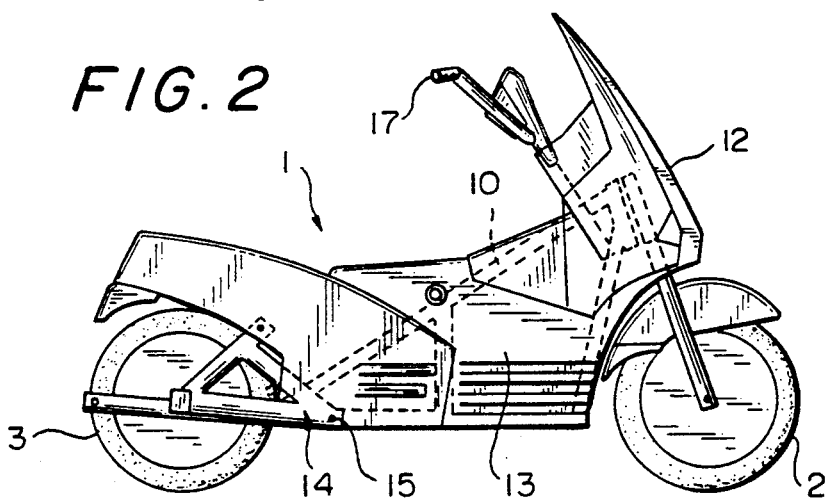
FIG. 2 is a side view of the device illustrated in FIG. 1 partially showing the rear wheel mounting construction.

In FIG. 2, a side view of the wheelchair shuttle 1, in accordance with the invention, is shown in operational condition. In this figure, the mounting construction 14 for the rear wheel 3 is illustrated. This concerns a triangular frame that is fitted to the frame 10 of the wheelchair shuttle 1 by a pivoting construction at 15, and is connected to the mounting construction of the other wheel by means of a torsion bar 16, in order to avoid any disturbing rolling when negotiating bends.

Figure 3:
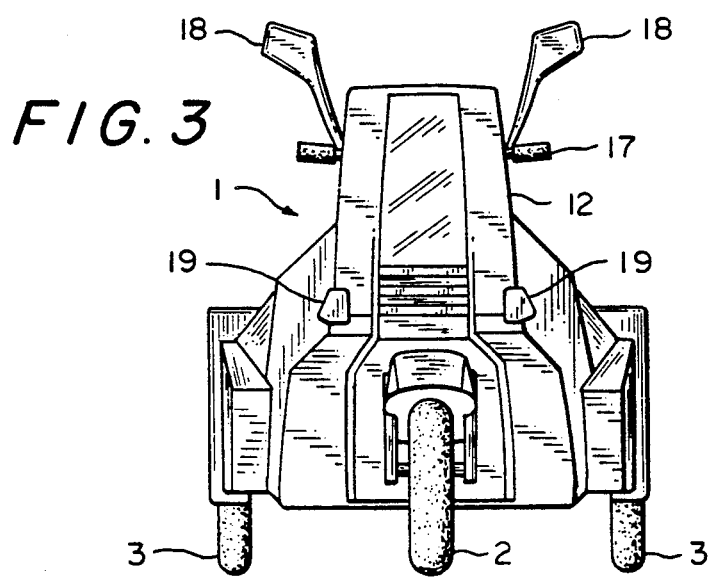
FIG. 3 is a front view of the device, the wheelchair shuttle, in accordance with the invention, equipped with full panelling, mirrors, lighting, etc.

In FIG. 3, a front view of the wheelchair shuttle 1 is shown. The entire construction appears as a vehicle with modern styling with bicycle type hand steering 17. To ensure safety, mirrors 18 have also been fitted. The front lighting 19 and the rear lighting are also of great importance when using the wheelchair shuttle during the ours of darkness.

Figure 4:
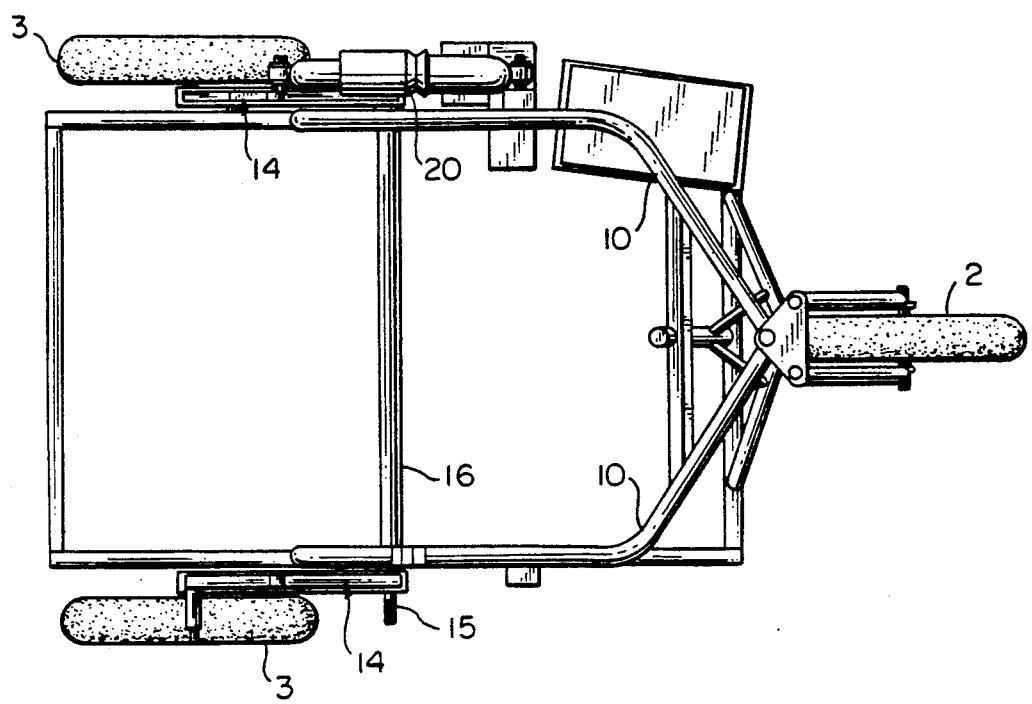
FIG. 4 is a plan view of the device in accordance with the invention, from which the panelling has been removed and only the frame is visible.

In FIG. 4, a plan view of the wheelchair shuttle 1 is shown with the panelling removed. A plan view of the rear wheel mounting construction 14 is illustrated, whereby on the left hand side only the adjustable suspension element 20 is shown. In FIGS. 5 to 7, the procedure for the mounting construction 14 for the rear wheels 3 is shown. The mounting construction 14 consists of a triangular frame, the base frame tube of which is called the swing-arm 21, and is equipped on one side with the extension 22 for operating the pivoted bar construction 23, which in turn operates the folding ramp construction 24. The mounting construction 14 is fitted by a pivoted construction to the frame 10 of the wheelchair shuttle 1 at point 15. The axle for the rear wheels 3 is located at the angle of point 25. The adjustable suspension element 20 is fitted to the triangular frame by a pivoted construction at point 26. For practical reasons, the adjustable suspension element 20 is the complete Ride Leveller Compressor System marketed by Monroe, whereby all necessary tested components are directly available and find good application in the wheelchair shuttle 1, in accordance with the invention. The adjustable suspension element 20 is mounted to frame 10 of the wheelchair shuttle 1 by a hinging construction at point 27. Each rear wheel may be separately driven by a power source, e.g., an electric motor powered by a rechargeable battery 38.

By varying the distance between 26 and 27, the rear wheels 3 can be raised (FIG. 6) or lowered (FIG. 7), through which the floor panel 8 can be lowered to the road surface 28 (FIG. 6) or raised to the driving position of the wheelchair shuttle 1 (FIG. 7).

Figure 8:
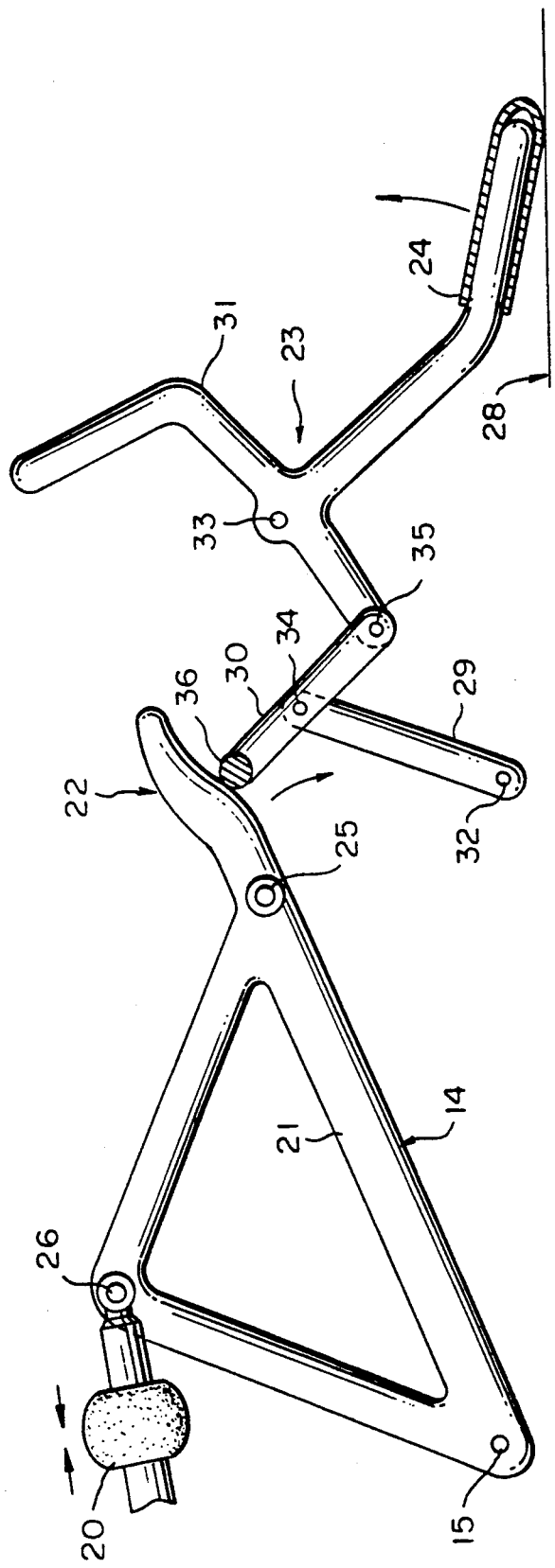
FIG. 8 is a schematic side view of the rear wheel mounting construction of the device in accordance with the invention, the wheelchair shuttle, in connection with the bar mechanism for operating the folding ramp construction, showing the folding ramp construction in the lowered position.

FIGS. 8 and 9 illustrate the operation of the mounting construction 14 in connection with the operation of the bar construction 23 which are connected together by a pivot construction. In FIG. 8, corresponding to FIG. 6, the folding ramp construction 24 has been lowered to the road surface 28 and the wheelchair 6 can drive into the wheelchair shuttle 1 from the rear. The bar construction 23 consists of three bars, namely, the first bar 29, the middle pivoting bar 30 and the third or last bar 31. The aforementioned ramp construction 24 consists of a ramp, fixed on both sides to a pivoted bar construction 23 equipped with a stop boss 36, fitted to the ends of the bars in the bar construction 23. The bar construction is operated by the aforementioned extension 32 to the base of the swing-arm 21 on the triangular frame for the wheel mount 11, through which the ramp construction may be folded upwards and downwards. When folded upwards, it locks the rear wheels of the wheelchair, and when folded downwards together with the pivoted floor panel, the device forms an extremely manageable ramp for the aforementioned wheelchair. More specifically, the pivoted bar construction 23 connected to one another consist of three special pivoted bars connected together. The first bar 29 is pivoted at one end 32 and fixed to the frame 10 of the wheelchair shuttle 1. One point of the last or third bar is also pivoted at one end 33 and fixed to the frame 10 of the shuttle. The middle or second bar is equipped with the aforementioned stop boss in front of the swing-arm 21 extension 22. The other pivoted points on the three bars have been fitted in a manner that the bar construction remains in a so-called push-through position when the ramp panel is in the folded position. The first bar 29 is mounted on the frame 10 of the wheelchair shuttle 1 by a pivot construction at point 32. The third or last bar 31 is mounted on the frame 10 of the wheelchair shuttle 1 by a pivot construction at point 33. The bars are also mutually connected by pivot constructions at points 34 and 35. When the extension 22 of the swing-arm 21 moves downwards (FIG. 8), the cam 36 travels with it, through which the bar construction 23 pivots and the folding ramp construction 24 moves upwards. The cam 36 is taken so far that the bar construction 'pushes through' at the end of its travel, and in doing so locks itself, effectively preventing it from clicking back. The bar 30 comes to rest against a stop boss 37. The bar construction 23 with the folding ramp construction effectively blocks the wheels of the wheelchair 6. The operation of the adjustable suspension element 20 can also clearly be seen in FIG. 8 and 9.

Furthermore, it can be stated that a preferential implementation has been described and that modifications are of course possible without departing from the extent of protection offered by this patent.

I claim:

1. A self propelled steerable vehicle for one person, who would normally be invalided by a leg and/or hip condition, the driver's seat of which may be a wheelchair, comprising:
    (A) a vehicle frame,
    (B) a floor panel, adapted so that a wheelchair may be driven onto the floor panel, that is pivotally connected to the vehicle frame therein providing an up and down movement in relation to a road surface,
    (C) at least one front wheel and two rear wheels, wherein each rear wheel (3) includes:
        (1) a separate mounting construction (14), which simultaneously pivots upwards or downwards in relation to the floor panel,
        (2) adjustable suspension elements (20) positioned in front of the rear wheels (3) and pivotally connected to a rear side of the floor panel whereon the floor panel (8) can be lowered to the road surface (28),
    (D) wherein the floor panel (8) includes:
        (1) a folding ramp construction (24) adapted to be driven on to by a wheelchair (6),
        (2) means (9) on the folding ramp construction for preventing the wheelchair (6) from rolling backwards,
    (E) a plurality of side panels connected to the floor panel, provided with means (11) for preventing the wheelchair (6) from rolling forwards, and
    (F) wherein the mounting construction (14) for the rear wheels (3) is movable downwards by the adjustable suspension elements, and the locking into position of the wheelchair (6) on the vehicle (1) during a journey is assured when the folding ramp construction (24) is raised.

2. Device as claimed in claim 1, wherein each rear wheel (3) is separately driven by a power source.

3. Device as claimed in claim 1, wherein the mounting construction (14) for each rear wheel (3) includes:
    (a) a triangular frame, which pivots in relation to the vehicle frame (10) around a first rear angle (15 on a base of the triangular frame wherein the base of the triangular frame forms a swing arm,
    (b) a wheel mounting located at a second angle (25) on the base of the triangular frame,
    (c) the adjustable suspension element (20) being pivotally fitted to a top angle (26) of the triangular frame, and pivotally coupled to the vehicle frame (1), and
    (d) a specially shaped extension (22) on the base of the swing arm (21) beyond the wheel mounting (14) on the triangular frame effecting operation of the folding ramp construction.

4. Device as claimed in claim 3, wherein the triangular frames for the mounting construction for the rear wheels (3) are mutually connected by a torsion bar (16) between a first pivoting point (15) at the rear angle on the base of the swing-arm (21).

5. Device as claimed in claim 3, wherein each rear wheel is separately driven by a power source.

6. Device as claimed in claim 1, wherein the adjustable suspension elements (20) are adjustable in length and include an inflatable bellows constructed around a shock absorber.

7. Device as claimed in claim 6, wherein the shock absorber is a pre-existing system.

8. Device as claimed in claim 7, wherein the pre-existing system includes:
    a compressor for making compressed air available;
    a relay with fuse for switching the compressor power supply;
    an operating panel with pressure gauge which indicates the pressure in the inflatable bellows constructed around the shock absorber;
    electric wiring and air lines.

9. Device as claimed in claim 1, wherein the means for preventing the wheelchair (6) from rolling backwards includes bellows (9) defined in the floor panel (8) at the location of the rear wheels (3) of a wheelchair (6).

10. Device as claimed in claim 1, wherein the means (11) for preventing the wheelchair (6) from rolling forwards include pivoted arms with a limited rotational angle, operable to be fitted by hand in front of a rear wheel of the wheelchair, and having a construction adjustable once to a required wheelchair wheel size.

11. Device as claimed in claim 3, wherein the ramp construction (24) includes:
    (a) at least two pivoted bar constructions having a stop boss and bars,
    (b) a ramp, fixed on both sides to the pivoted bar construction (23), fitted to the ends of the bars in the bar construction (23),
    (c) the bar construction being operable by the extension (22), whereby the ramp construction (24) may be folded upwards and downwards, and when folded upwards locks the rear wheels of the wheelchair, and when folded downwards together with the pivoted floor panel (8) forms an extremely manageable ramp for the wheelchair (6).

12. Device as claimed in claim 11, wherein the pivoted bar construction (23) are connected to one another and include:

(a) a first bar (29) pivoted at one end (32) and fixed to the frame (10),
(b) a third bar pivoted at one end (33) and fixed to the frame (10),
(c) a second bar equipped with the stop boss in front of the extension (22), the other pivoted points on the bars fitted wherein the bar construction remains in a push-through position when the floor panel is folded.

13. Device as claimed in claim 2, wherein the power source is an electric motor, powered by a rechargeable battery.

14. Device as claimed in claim 1, wherein the frame and the floor panel (8) have been manufactured from metal and the panels include synthetic material.

15. Device as claimed in claim 14, wherein the metal is one of steel and aluminum, and the synthetic material is ABS.

16. Device as claimed in claim 1 further comprising lighting and directional indicators fitted in accordance with road traffic legislation applicable in the relevant country.

17. Device as claimed in claim 1, wherein at least one of the wheels is driven.

18. Device as claimed in claim 5, including an axle located at the rear angle (25) of the wheel mounting equipped with a driving disc for the purpose of driving the rear wheel (3), and also for coupling the separate power source to each rear wheel.

* * * * *